Sept. 16, 1958  R. B. TEMPLE ET AL  2,852,312
QUICK ACTING RIM CLAMP
Filed May 21, 1956
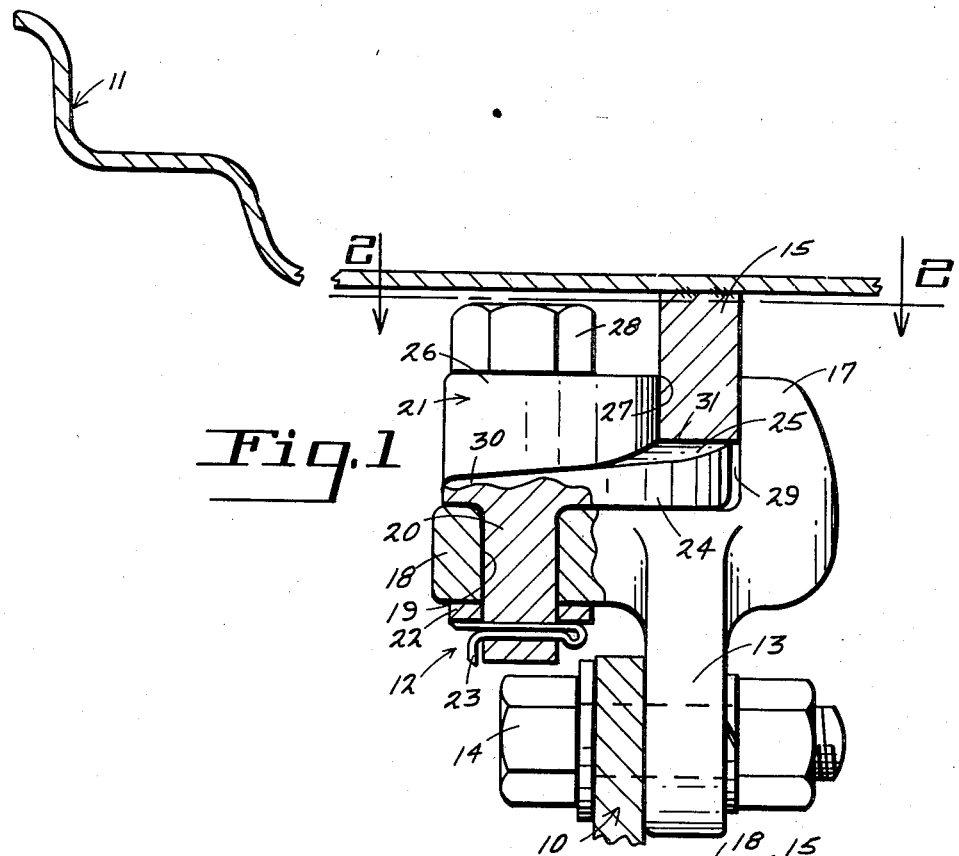
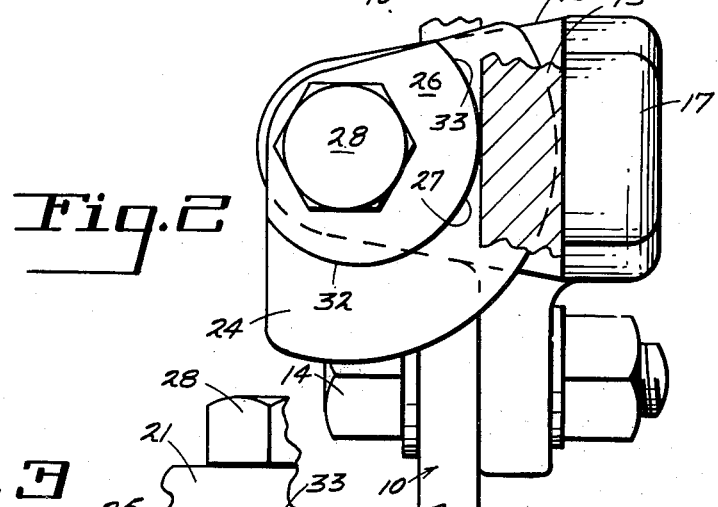
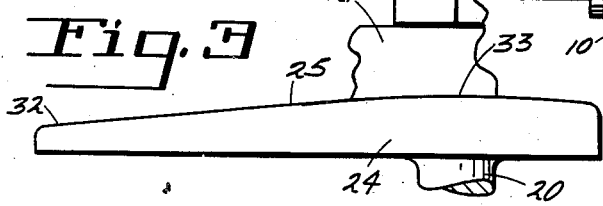
INVENTORS.
ROBERT B. TEMPLE.
EDWARD R. CAROLIN.
BY Whittemore, Hulbert &
Belknap

United States Patent Office 2,852,312
Patented Sept. 16, 1958

2,852,312

QUICK ACTING RIM CLAMP

Robert B. Temple, Detroit, and Edward R. Carolin, Royal Oak, Mich., assignors to Kelsey-Hayes Company, a corporation of Delaware Application May 21, 1956, Serial No. 586,088

7 Claims. (Cl. 301—9)

The present invention relates to an improved quick acting clamp for the wheel of an adjustable tread vehicle, such as a tractor. In wheels of this type, the wheel rim has a plurality of axially inclined rails welded on its inner periphery, each rail being engageable by a guide carried on the coaxial wheel disk or body for axial camming adjustment of the rim upon relative rotation of the wheel body and rim.

It is an object of the invention to provide an improved guide and clamp unit, of which a set are to be mounted on the wheel body for the described camming engagement with the rim rail, which unit is actuable to clamp the rim rigidly in its adjusted position by a combined rotative wedging of the rail in both the axial and the radially outward directions.

Another object is to provide a guide and clamp unit of this type in which the operation of clamping the rim, as well as releasing the clamping force, are performed with ease and speed by a fractional turn of a rotative wedging clamp member.

More specifically, it is an object of the invention to provide a quick acting clamp structure including a fixed guide and clamping jaw mounted on the wheel body to extend radially outward adjacent one axial side of the rail, together with a guide and clamping cam rotatably mounted adjacent the opposite side of the rail on a radially extending axis. The cam is preferably of a unitary construction including an axially acting cam portion wedgingly engageable with the rail in opposition to the fixed jaw, and a radially outwardly acting cam portion similarly wedging beneath the inner periphery of the rail for the combined clamping effect.

Still more specifically, it is an object to provide an improved adjustable tread wheel, and a quick acting clamp as described, in which the fixed jaw of the clamp, as mounted on the wheel body, carries a lateral extension or flange which rotatably mounts the dual action clamping cam.

The foregoing as well as other objects will be made more apparent as this description proceeds, especially when considered in connection with the accompanying drawings, wherein:

Fig. 1 is a fragmentary view, partially broken away and in section in an axial plane through the wheel axis, illustrating the improved clamp as applied to an adjustable tread wheel structure according to the invention;

Fig. 2 is a view in section along line 2—2 Fig. 1; and

Fig. 3 is a horizontal development of the radially acting rail clamping cam of the clamp.

The reference numeral 10 of the drawings generally designates a conventional wheel disk or body coaxial of a wheel rim 11, which is secured to the body by a plurality of the improved quick acting clamps 12 of the invention, spaced circumferentially about the periphery of the body 10. Each clamp includes a mounting bracket 13 in engagement with a side of the body and secured thereto by suitable bolts 14 and coacting nut and washer provisions to provide a rigid, displacement-free mount for the clamp 12.

The rim 11 has a series of inclined rails 15 welded to its inner surface in circumferentially spaced relation about the same in a well-known manner; and the clamp 12 is mounted radially inwardly of each of these rails. Each clamp comprises a rail guide and clamp structure outwardly of the wheel body periphery having a rail guide and clamp jaw 17 extending radially outwardly and overlapping a side surface of the rim rail 15. The structure also includes an integral, axially extending flange or ledge 18 of substantial thickness and rigidity, which is radially apertured at 19 to receive an inner integral stem extension 20 of the dual acting guide and clamp cam or jaw 21 of the clamp. A spacer washer 22 is applied to the stem 20 radially inwardly of flange 18, with a cotter pin 23 extending through the stem beneath the washer to hold the cam in place, while permitting its rotation. This rotation is about a limited arc, as will appear.

The cam 21, formed integrally on the stem 20, includes a radially inner cam portion 24 immediately adjoining the stem which presents a radially outwardly facing cam surface 25, and a radially outer, axially acting cam portion 26 having an axially acting, rounded cam surface 27. A hex head actuator 28 may be formed integral with cam 21 to receive a wrench in the radial space between the rim 11 and the outer cam portion 26.

The nature of the respective cam portions 24, 26 is shown in Figs. 2 and 3. As depicted in the rail clamping position of the cam, the inner, radially outwardly acting cam portion 24 is concentric with the cam axis through the stem 20, with an appropriate clearance at 29 (Fig. 1) between its perimeter and the coacting fixed jaw 17. The cam surface 25 intervening between this perimeter and that of the axially acting cam portion 26 is a circumferentially inclined and warped one, ranging from a "low" at 30 (rail releasing position) to a "high" at 31 (rail clamping position).

The cam portion 26 is eccentric in relation to the cam axis, developing circumferentially from a minimum diameter "low" at 32 (Figs. 2 and 3) to a "high" at 33.

In its operative clamping position shown in Figs. 1 and 2, the cam portions 24, 26 have been rotated as a unit to engage the respective inner radial and axial side surfaces of the rail 15 to clamp the same securely with a strong wedging action, chording the rim 11 to some extent in this. When the cam 21 is rotated no more than 90° on its stem 20, the cam surfaces 25, 27 recede from the rail radially and axially, respectively, leaving the rail free of the clamp. Cam portion 26 then coacts with fixed jaw 17 as a guide in causing axial adjustment of the rim by engaging the rail 15 in one axial direction or another as the wheel body 10 is rotated relative to the rim. The clamp is reengaged by a simple 90° reversal of the cam rotation, as will be apparent.

An advantage of the present guide and clamp, other than in respects previously mentioned, resides in the fact that it requires no particular registering, in the axial sense, of its clamping provisions in respect to coacting clamping provisions on the rail 15, as has been the case in certain previous clamp arrangements. The parts are simple and inexpensive; the bracket 13 is a readily produced casting, and the cam 21 is produced relatively inexpensively as a coined forging. The strong dual wedging action of the cam 21 on the rail suffices to hold the clamp in engaged position, without likelihood of accidental displacement.

What we claim as our invention is:

1. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, and a cam device rotatable on a radial axis at the opposite side of said rail, said cam device exerting wedging action on said rail to urge the same axially against said jaw and radially outwardly.

2. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, a support connected to said jaw member and extending axially and radially inwardly of said rail, and a cam device rotatable on a radial axis on said support at the opposite side of said rail, said cam device exerting wedging action on said rail to urge the same axially against said jaw and radially outwardly.

3. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, a support integral with said jaw member and extending axially and and radially inwardly of said rail, and a cam device rotatable on a radial axis on said support at the opposite side of said rail, said cam device exerting wedging action on said rail to urge the same axially against said jaw and radially outwardly.

4. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, a support integral with said jaw member and extending axially and radially inwardly of said rail, and a cam device rotatable on a radial axis on said support at the opposite side of said rail including integrally connected portions, said cam device including axially and radially facing rounded surfaces exerting wedging action on said rail to urge the same axially against said jaw and radially outwardly, respectively.

5. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, and a cam device at the opposite side of said rail, said cam device exerting wedging action on said rail to urge the same axially against said jaw and radially outwardly, said cam device and jaw having sliding coaction with said rail to guide said rim for axial adjustment upon relative rotation of said rim and wheel body.

6. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, and a cam device rotatable on a radial axis at the opposite side of said rail, said cam device exerting wedging action on said rail to urge the same axially against said jaw and radially outwardly, said cam device and jaw having sliding coaction with said rail to guide said rim for axial adjustment upon relative rotation of said rim and wheel body.

7. A clamp for an adjustable tread wheel of the type having a rim provided with an inclined rail on its inner periphery, said clamp being adapted to be secured on a wheel body which is coaxial of said rim and comprising a jaw outwardly overlapping a side of said rail, a support integral with said jaw member and extending axially and radially inwardly of said rail, and a cam device rotatable on a radial axis on said support at the opposite side of said rail including integrally connected portions, said cam device including axially and radially facing rounded surfaces exerting wedging action on said rail to urge the same axially against said jaw and radially outwardly, respectively, said cam device and jaw having sliding coaction with said rail to guide said rim for axial adjustment upon relative rotation of said rim and wheel body.

References Cited in the file of this patent

UNITED STATES PATENTS

| 1,001,802 | Baker | Aug. 29, 1911 |
| 2,417,139 | Strehlow | March 11, 1947 |

FOREIGN PATENTS

| 336,189 | Great Britain | Oct. 9, 1930 |